United States Patent [19]

Johnson et al.

[11] 3,796,997

[45] Mar. 12, 1974

[54] OPTICAL READ-OUT/READ-IN APPARATUS FOR PLASMA DISPLAY/MEMORY PANELS

[75] Inventors: Roger L. Johnson, Monticello; William J. Coates, Champaign, both of Ill.

[73] Assignee: University of Illinois Foundation, Urbana, Ill.

[22] Filed: Nov. 24, 1972

[21] Appl. No.: 309,099

[52] U.S. Cl... 340/173 PL, 340/324 R, 315/169 TV

[51] Int. Cl. .............................................. G11c 7/00

[58] Field of Search........ 340/173 PL, 324; 315/169

[56] References Cited

UNITED STATES PATENTS 3,037,189 5/1962 Barrett.......................... 340/173 PL

*Primary Examiner*—Terrell W. Fears

*Attorney, Agent, or Firm*—Merriam, Marshall, Shapiro & Klose

[57] ABSTRACT

Apparatus for determining the state of selected cells in a plasma panel, including control drive means supplying a control signal during an interrogation interval between sustaining discharges capable of changing the state of a cell if the cell is in a state (A) but not if the cell is in another state (B), optical read-out means for detecting any changes in the state of a selected cell during the interrogation interval, and means for restoring the selected cell to the original state (A) if the cell was changed to state (B). Apparatus for transferring information on an image bearing document into the plasma panel by interrogating all of the cells on the panel and restoring selected cells in response to information determined by optical read-out means during said interrogation, whereby the image is then associated with selected cells on the panel.

13 Claims, 4 Drawing Figures

OPTICAL READ-OUT/READ-IN APPARATUS FOR PLASMA DISPLAY/MEMORY PANELS

This invention relates to optical read-out of information and more particularly to the optical read-out of information associated with a matrix array of light emitting elements, such as a plasma display panel.

One type of display device having properties of an addressable matrix of light emitting elements exhibiting inherent memory now has become known as the "plasma display panel" or the "plasma display/memory panel." Such plasma display panels comprise an array of gas discharge cells separated from exciting electrodes by dielectric material, as described in U.S. Pat. No. 3,559,190, "Gaseous Display and Memory Apparatus," D. L. Bitzer et al., issued Jan. 26 1971, and assigned to the same assignee here. The aforementioned patent also discloses the general concept of using optical read-out techniques for extracting information in a non-destructive manner from an array of plasma display elements, particularly in connection with FIGS. 9 and 10 as described in column 12, line 25 continuing to column 13, line 50. As therein described, an interrogating sustaining signal sufficient to discharge a cell in the ON state but not sufficient to discharge a cell in the OFF state is to be applied to a selected cell during the period between the normally supplied sustaining signals. A photodetector observing the panel can thereby detect the state of the selectively addressed cell. Since a sustaining signal is used for interrogation, this suggested technique does not destroy the stored information. In other words, the interrogated cell's state is not changed.

Presently used drive systems for plasma display panels, however, do not provide a controllable sustaining signal drive per line. Thus, the selective application of an interrogating sustaining signal with currently available drive systems is not possible. It is, therefore, desirable to provide optical sensing which would be compatible with presently available drive systems rather than using techniques which would require specially designed sustain/control drive systems. Optical sensing could then be utilized as an optional add-on feature independent of the panel drive scheme.

SUMMARY OF THE INVENTION

The present invention provides an optical readout apparatus for extracting information stored in a plasma display panel in a manner compatible with existing panel sustain/control drive systems. The system write and erase control signals are selectively coupled to a selected cell during an interrogating interval between sustaining pulses to initiate a state change by enabling a discharge and a corresponding light output.

In an illustrated embodiment of the invention, during the interrogating interval an applied control pulse causes a discharge and an associated light output in a selected cell which was in the ON state; but does not cause a discharge (therefore no light output) in a cell which was OFF. A photodetector observing the plasma panel during a read-out interval synchronized to the application of the initial control pulse can then detect the state of the interrogated cell. The ON cell must then be restored to its original state within the interrogating interval by subsequently applying another control pulse.

In another aspect of the present invention, information on an image bearing transparency is transferred into the plasma panel using the interrogating and optical read-out technique set forth above. In one embodiment, all of the panel cells are placed in the ON state, and the image bearing transparency is located intermediate the panel and a photodetector. The panel is interrogated by scanning each cell and optically reading-out the cell state as previously set forth. Those cells transmitting light through the transparency which is observed by the photodetector are kept ON by restoration. Those cells transmitting light which is blocked by an opaque image on the transparency are not restored, and thus are placed in the OFF state. The panel now has OFF cells corresponding to the opaque image, and ON cells corresponding to the clear portion of the transparency. If desired, the image can be transferred to a panel in the initial OFF state as well.

DETAILED DESCRIPTION

As indicated above, the complete description of a plasma panel is set forth in U.S. Pat. No. 3,559,190, and reference may be made thereto. However, for purposes of describing the present invention, a brief summary of some basic principles is herein provided.

Physically, the plasma display/memory panel is an array, generally rectangular, of gas discharge cells that are separated from exciting electrodes by dielectric sheets. Except when information is changed, every cell of the array is excited by the same alternating voltage, or sustaining signal. In the most commonly used mode of excitation, the sustaining voltage waveform, by itself, is not of sufficient magnitude to initiate a discharge in any of the elements. If, however, previous electrical activity in a cell has left the cell dielectric end walls charged to an adequate level, the resultant wall voltage can augment the applied sustaining voltage and cause a discharge in the cell. During this discharge, electrons and ions flow to the walls in response to the applied field, these charges depress the internal field and thereby extinguish the discharge. In the next half cycle, the charge collected on the end walls will again augment the applied voltage and cause a discharge to take place in the opposite direction. Thus, the alternating or sustaining voltage, which by itself is not able to initiate a discharge, will sustain a stable sequence of discharges, repetitively, in an element if appropriate wall voltage conditions are established by each previous discharge.

The state of a cell which sustains a stable sequence of discharges, i.e., one discharge each one-half cycle of the applied voltage, is also characterized by light output and is usually defined as the "one" or ON state.

The other state, which exhibits no discharge activity, and has no light output, is called the "zero" or OFF state. State changes in a plasma display element are accomplished by establishing the wall charge condition of the desired state. Although there are now well known techniques for accomplishing state changes, the primary technique utilizes coincidentally applied voltage perturbations (control pulses) as described for instance in a published article of R. L. Johnson, D. L. Bitzer and H. G. Slottow, "The Device Characteristics of the Plasma Display Element," I.E.E.E. Transactions On Electron Devices, Vol. ED-18, No. 9, pp. 642–649, Sept., 1971. A typical sustain voltage waveform, the light output for both states of an element and the control (write and erase) pulses which are superimposed on the sustain waveform are illustrated in the top portion of FIG. 2 here. The write and erase control signals are used in present systems to effect selective state changes by creating discharge activity and light output in selected cells.

Figure 1:
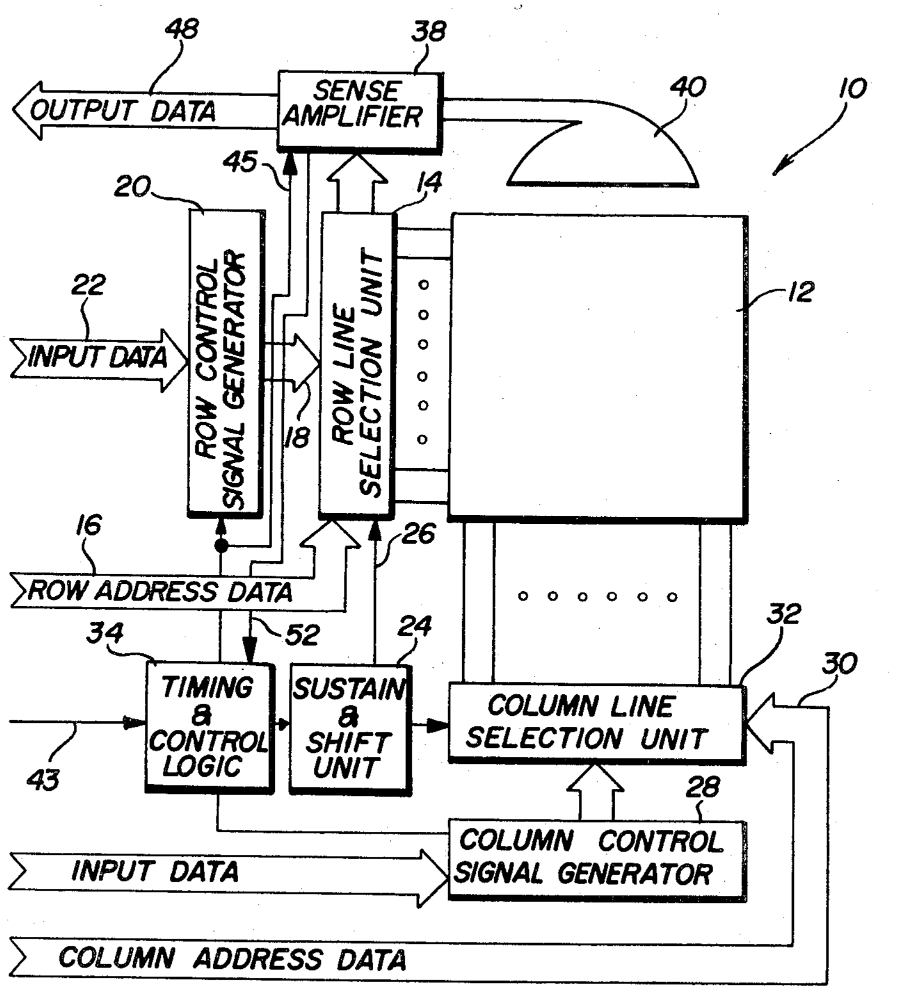
FIG. 1 is a block diagram illustrating an optical read-out system as applied to a plasma display panel in accordance with the principles of the present invention.

Referring now to FIG. 1, there is illustrated in block diagram form apparatus in accordance with the principles of the present invention for obtaining optical readout of information stored in a plasma panel in a manner which is compatible with existing sustain/control drive systems. Thus, optical sensing in accordance with the principles of the present invention becomes an optional or add-on feature independent of the type of panel drive technique used.

Referring now to FIG. 1, there is illustrated an optical read-out system 10 for interrogating, optically sensing, and deriving information stored in a plasma display panel 12. It is to be understood that while the present invention is described in connection with the plasma display panel, the invention is useful with any addressable matrix of light emitting elements exhibiting inherent memory.

As previously indicated, the plasma display panel 12 includes an array of gaseous discharge cells, and associated row electrodes and column electrodes. The array of row electrodes are selectively addressable through a row line selector 14 in response to row address data input 16. Control signals for writing or erasing information in the panel are supplied through input 18 from a row control signal generator 20 responding to its data input 22. A sustaining signal generator 24 supplies the required alternating sustaining signals into the row selector at input 26 for repetitively discharging the ON cells in a sustaining sequence.

In accordance with the principles of the present invention, the plasma panel is interrogated during an interrogation interval (see FIG. 2, top) between sustaining pulses.

Similarly, the sustaining signal generator 24, a column control signal generator 28, and a column address data input 30 are coupled through a column line selector 32 to the array of plasma panel column electrodes. Timing and control logic apparatus 34 is provided for controlling the application of the sustaining signals through generator 24 and the application of the desired control signals through row control signal generator 20 and column control signal generator 28 in their application to the array of row and column electrodes of plasma panel 12.

The components hereinabove described in connection with FIG. 1 are standard components in existing systems for supplying sustain/control drive signals to a plasma panel. Such systems supply a sustain/control voltage waveform which is illustrated at the top portion of FIG. 2. Thus, as in conventional sustain/control drivers for plasma display panels, there is applied a sustaining signal illustrated in FIG. 2 to all of the display elements. Cells which are in the ON state discharge and provide a light output, repetitively, once each half cycle of the sustaining signal. Cells which are in the OFF state are not discharged by the sustaining signal and thus remain off.

Figure 2:
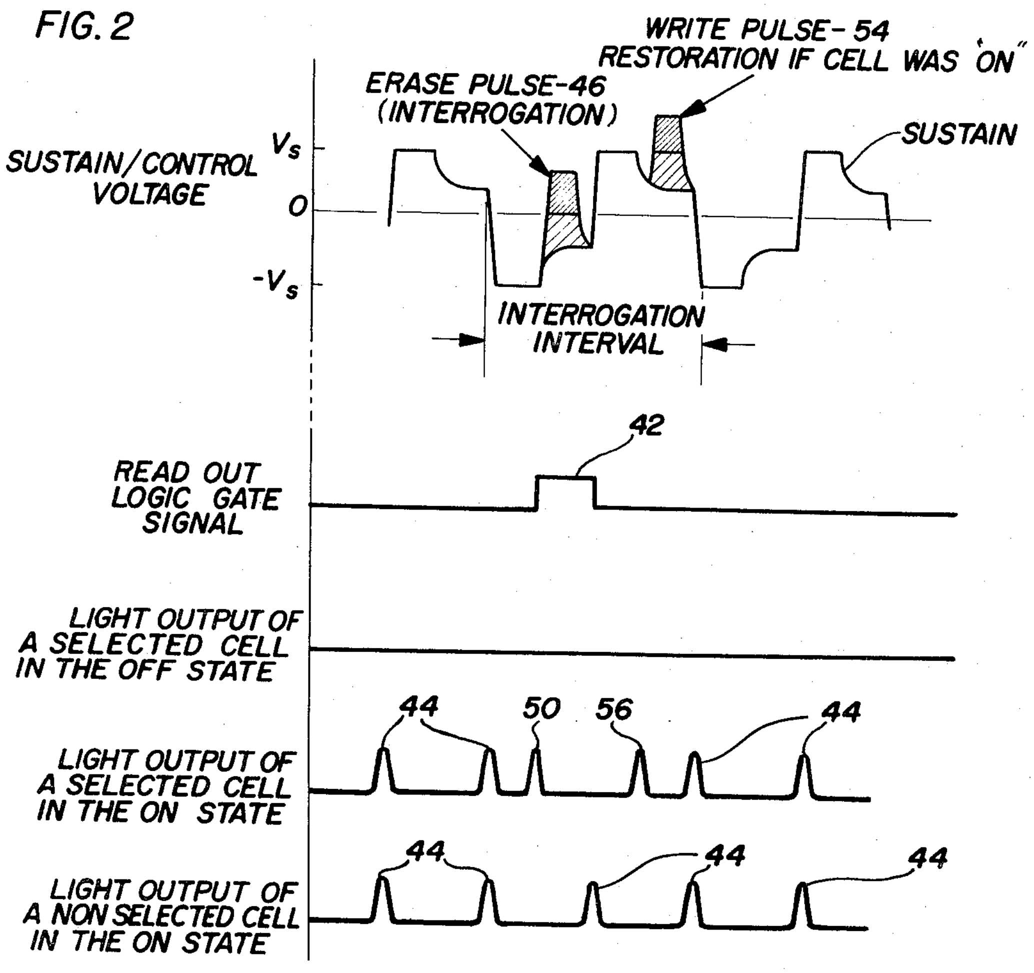
FIG. 2 illustrates various waveforms associated with interrogation of the plasma panel during optical read-out, and if necessary, cell restoration.

An optical read-out interval within the interrogation interval is initiated by a read-out logic gate signal 42 which is applied to the timing and control logic 34 on input line 43 for activating the sense amplifier 38 through line 45. The photodetector 40 either can be constantly activated or selectively activated only during the optical read-out interval. Thus, during this readout time the photodetector is observing the panel for any light output from a selected cell. Since this readout interval is between the sustaining pulses, there would be no light output from the panel under normal circumstances as in existing systems not having an optical read-out capability. For instance, as shown in the lower portion of FIG. 2, the light output of a selected cell in the ON state occurs at precise sustaining intervals indicated by the pulses 44. There is of course no light output from a selected cell which is in the OFF state as shown in FIG. 2. And, there is no light output from a non-selected cell during the read-out interval (FIG. 2, bottom).

Thus, in accordance with the principles of the present invention, during the read-out interval, a readout logic gate signal 42 is applied to the timing and control logic to initiate optical read-out as well as to apply erase pulse 46 to a selected cell. If the selected cell was in the OFF state, the application of erase pulse 46 does not change the state of the cell. Thus, as shown in FIG. 2, there is no light output from the OFF cell and therefore this is sensed by photodetector 40 and through sense amplifier 38 the information is presented on output line 48. If, however, the selected cell was in the ON state, the application of erase pulse 46 during the readout interval provides a light output from this cell during this interval. Referring now to FIG. 2, the light output of a selected cell in the ON state due to the application of erase pulse 46 in the read-out interval is illustrated as light output pulse 50. This of course is sensed by the photodetector and converted into suitable electrical information presented on output line 48.

It must be noted that the application of erase pulse 46 to an ON state cell removes the information stored in the cell and would be lost unless the cell was restored again to its ON state. Restoration during the interrogation interval is provided through line 52 which couples the sense amplifier 38 to the timing and control logic 34. Thus, detection of light output from an ON cell during the read-out interval is used to signal the timing and control logic 34 to present a write pulse 54 to the selected cell and the selected cell is again placed in the ON state as shown by light output pulse 56. Thereafter, the cell is maintained in the ON state by the sustaining signal and the normal light output pulses 44 resulting from the combination of the cell wall voltage and the sustaining signal.

In a constructed embodiment of the invention, the plasma panel 12 incorporated in the system was a 128 × 128 line (33⅓ lines per inch) Digivue panel manufactured by Owens-Illinois Co. The frequency of the sustain voltage waveform was 40 kHz thus allowing for a maximum of 40,000 write or erase operations per second. In the constructed embodiment, only one operation per cycle could be accomplished. As a result, the interrogation of a cell requires two cycles, one for read-out and one for write-in if necessary. Write-in could, however, be accomplished within the same sustain cycle as the read-out signal if desired in a manner well within the knowledge of those skilled in the art. If such a signal format were implemented, then the optical read-out system would exhibit a maximum serial output rate of 40K bits per second rather than the 20K bits per second in the constructed embodiment.

It also is to be realized that read-out using the principles of the present invention is in a serial manner, i.e., the cells are interrogated and read-out one at a time. It is understood, of course, that some degree of parallelism can be provided by the use of multiple photodetectors, each looking at a defined subarea of a panel.

It is also understood that the write pulse may be used for interrogation rather than the erase pulse as illustrated above. In this case, if the write pulse is used and the selected cell being interrogated was in the ON state, there would be no light pulse during the read-out interval. If the cell being interrogated was in the OFF state, application of a write pulse during the read-out interval would provide a light output. In order to restore the cell to its previous condition, an erase pulse must thereafter be applied. In either event, the above described optical read-out technique is a destructive read-out process. In order to avoid losing the information stored in a cell which has undergone a state change due to interrogation during read-out, the cell must be returned to its original state with the application of an appropriate control signal.

Various area photodetector configurations for use in plasma display optical read-out systems have been investigated. In particular, it was necessary to study the optical properties of the plasma display device under consideration particularly with respect to two primary characteristics: (1) the energy distribution of the light emitted from an element of the array; and (2) the light amplitude profile of an element in terms of spatial distribution. Well known spectra analysis and calculations indicate that standard photomultiplier tubes are well suited for detecting single pulse light output signals from a plasma panel of the type previously indicated. However, in designing an area photodetector system, additional considerations must be given to: (1) the ambient or background light which is incident upon the photodetector; and (2) the residual light output of cells which is present long after the primary sustain discharge events have ceased. A full discussion of these considerations is presented in "Data Manipulation and Sensing - Plasma Display" by the Coordinated Science Laboratory, University of Illinois, R. L. Johnson, published December, 1971, as Final Technical Report, RADC-TR-71-274, pages 31–44. Reference may be made to that publication for a full discussion. For the purposes of this application, the following summary is presented.

Incident ambient (or background) light becomes a source of noise in systems which require that the information stored on the panel be visible to the user. In these configurations at least one of the panel surfaces is exposed to the ambient environment, and since the panel is transparent, this ambient light can proceed through the panel and impinge upon the surface of the photodetector. The ambient environment usually consists of light from a combination of three sources: (1) sunlight; (2) incandescent light; and (3) flourescent light. Since light from the plasma display panel consists of short duration pulses, i.e., pulses of the order of one to 3 microseconds in length, low frequency time variations in the strength of the ambient sources can be eliminated at the output of the photodetector by means of well known electrical signal filtering techniques. However, the high frequency components of the ambient light must be eliminated by other techniques.

In one constructed embodiment of an optical read-out configuration, the portion of the panel being read-out was not visible to the user. In this configuration, information was stored on a lower (non-viewable) section of the panel, and when required, this information was read-out and transferred to the upper (or viewable) portion of the panel. A 931A photomultiplier was used as the detector in this configuration. This system operated correctly and reliably in the normal ambient light environment of a laboratory. The restriction of not being able to view the information to be read-out, however, precludes the use of this technique in general purpose display applications.

A second technique utilizes polarizing filters on both sides of the panel with the polarizing filter on the rear of the panel positioned so that its pass angle is at 90° to the pass angle of the filter on the panel front. Moderate success was obtained for a constructed embodiment of this technique in low ambient light situations, but satisfactory separation in normal ambient light situations was not obtained due to light scattering effects.

Figure 3:
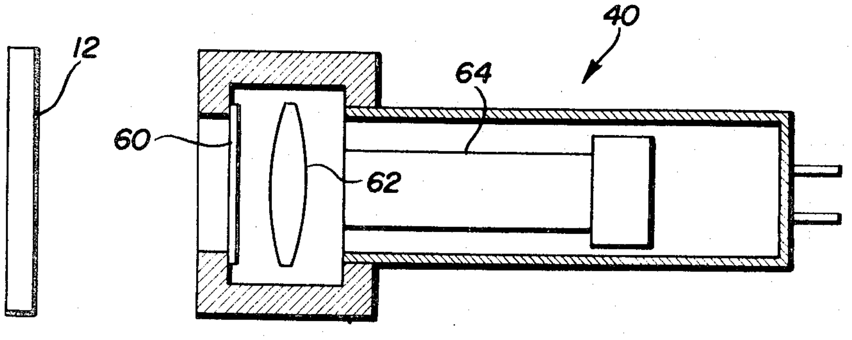
FIG. 3 illustrates a photodetector-optical filter apparatus for read-out of information on a plasma panel.

A third technique is illustrated in FIG. 3. This technique utilizes five nanometer band pass optical filters to reduce the amount of ambient light incident on the photodetector by rejecting all optical frequencies (or colors) except those corresponding to the strong emission lines from the panel. By utilizing the plasma panel hereinabove specified, it was found that there was a strong neon line spectra near 703.24 nanometers which is much larger than the neighboring band spectra. Since this line is significantly more energetic than the background, a narrow band pass filter with its peak pass wavelength chosen near 704.24 nanometers should allow for the detection of this line while rejecting the ambient background light. As shown in FIG. 3, a 5 nanometers filter 60 admitting radiation near 703.24 nanometers is utilized with photodetector 40. In a constructed version of the illustration of FIG. 3, the photodetector 40 comprised filter 60, lens 62, and an EMI 9558 photomultiplier 64. The entire plasma display panel 12 was read-out in normal ambient room light. Thus, in the configuration shown in FIG. 3, it was unnecessary to enclose the space between the photomultiplier and the panel.

The second source of optical noise is the residual light output of the plasma display cells. The level of this noise is dependent on both the number of cells that are being sustained in each of the two states and the time at which the photodetector samples the array. Various techniques are still being investigated in order to reduce any possible error in read-out due to this effect.

Figure 4:
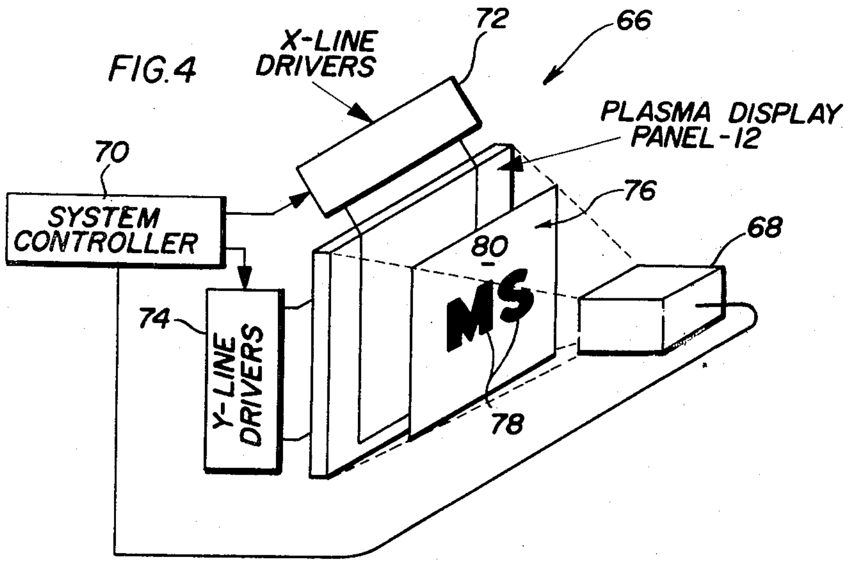
FIG. 4 illustrates another aspect of the invention wherein optical read-in of information into the plasma panel is accomplished using panel interrogation and optical read-out in accordance with the present invention.

In accordance with another aspect of the present invention, the interrogation and optical readout technique described here can also be used to form an analog to digital image converter using the apparatus shown in FIG. 4. Since the optical read-out/write-in apparatus 66 of FIG. 4 involves basically the same apparatus shown in FIG. 1, for convenience of illustration, the various apparatus shown specifically in FIG. 1 is illustrated in schematic combination in FIG. 4. Thus, the photodetector assembly 68 would include a photodetector and a sense amplifier. Similarly, the block labeled "System Controller" 70 operates into X line drivers 72 and Y line drivers 74 in the same manner as the sustain/control drive apparatus specifically shown in FIG. 1 and with the waveforms shown in FIG. 2. However, in addition to this apparatus there is also provided a photographic transparency 76 containing an opaque image 78 on a clear background 80.

Thus, in accordance with this aspect of the invention, if a black on clear transparency 76 containing a black image 78 is placed between the plasma panel 12 and the photodetector apparatus 68, then scanning the cells of the panel with interrogate commands, such as erase pulses 46 in an interrogation interval as shown in FIG. 2, will cause the information contained on the transparency to be transferred into the panel. As an example, the black or otherwise opaque image "MS" on the transparency shown on FIG. 4 can be transferred into the plasma panel 12 in the following manner. Initially all of the cells on the plasma panel are turned ON so that the light from cells on the panel which passes through the clear portion 80 of the transparency 76 can be detected by photodetector 68. However, the light from cells on the panel directed to the black image 78 is not detected by photodetector 68. Thus, as in FIG. 1, the system controller 70 scans each cell of the panel by applying an erase pulse, and any light output from the interrogated cell is optically read by photodetector 68. If light is detected at an interrogated cell, the system controller 70 applies a write pulse to restore the cell to the ON state. However, if no light is detected, then the corresponding cells are not restored and thereby placed in the OFF state.

Thus, if the detector received light from a cell during the read-out interval, the cell was restored to the ON state. However, if the detector received no light from a cell (being blocked by image 78), the cell was enabled to turn OFF. The panel now contains cells in the ON state corresponding to the clear portion 80, and cells in the OFF state corresponding to the image 78, although the reverse can be provided as well.

In the alternative, all panel cells can be initially OFF. In this case, each cell can be interrogated by a write pulse. Those cells which are "seen" through the transparency by the detector are allowed to remain ON by restoration after interrogation; whereas those cells which are not "seen" (since they are behind image 78) are turned OFF by failure to restore after interrogation. The image on the transparency is thus transferred to the plasma panel with the ON cells representing the image and the OFF cells the clear portion, although the reverse can as well be provided by this technique. Various applications of this technique include image converters and computer card readers.

The foregoing detailed description has been given for clearness of understanding only, and no unnecessary limitations should be understood therefrom, as modifications will be obvious to those skilled in the art.

What is claimed is:

1. Apparatus for determining the state of selected cells in a plasma panel, said apparatus comprising:
   control drive means for supplying a control signal capable of changing the state of selected cells;
   means coupling said control drive means to a selected cell during an interrogation interval for changing the state of said cell if in a state (A) but not if in another state (B);
   optical read-out means for detecting changes in the state of said selected cell during said interrogation interval; and
   means for selectively coupling said control drive means to said selected cell during said interrogation interval for restoring said cell to the original state (A).

2. Apparatus as claimed in claim 1, wherein said control drive means includes means for supplying a sustaining signal to said plasma panel for maintaining the state of said cells in a repetitive sustaining discharge sequence; and said apparatus includes timing means coupled to said control drive means and said optical read-out means to enable said interrogation interval intermediate said sustaining discharge sequence.

3. In plasma panel apparatus, including a plurality of gaseous discharge cells, sustain/control drive means for supplying (1) selective write and erase control signals for respectively entering and erasing information by changing the state of said cells, and (2) sustaining signals for sustaining entered information in said panel in a repetitive sustaining sequency, thereby maintaining the state of said cells, the improvement comprising:
   interrogation means for respectively applying an interrogating signal to said cells during an interval intermediate said sustaining sequence for changing the state of said cell, enabling a gaseous discharge and a corresponding light output during said interval;
   restoration means for restoring the state of cells changed during respective intervals; and
   optical read-out means for detecting and indicating a light output from the respective cells interrogated during said intervals, whereby those cells providing said light output are in one of said states and those cells not providing said light output are in the other of said states.

4. Apparatus as claimed in claim 3, wherein said interrogation means includes means for coupling one of said control signals corresponding to said interrogating signal to respective cells during said interval for changing the state of said cell; and said restoration means includes selective means for coupling the other of said control signals to selected cells during said respective interval if said light output is detected by said optical read-out means.

5. Apparatus as claimed in claim 4, including means for coupling said erase control signal to respective cells during said interval for changing the state of cells in the ON state, and for coupling said write control signal to cells which changed states in response to said erase signal so as to restore said cells to their ON state.

6. Apparatus as claimed in claim 4, including means for coupling said write control signal to respective cells during said interval for changing the state of cells in the OFF state, and for coupling said erase control signal to cells which changed states in response to said write signal so as to restore said cells to their OFF state.

7. A method for transferring an image from an image bearing document to a plasma panel of gaseous discharge cells, via optical read-out apparatus, comprising:

locating said image bearing documents intermediate said optical read-out apparatus and the plasma panel;

driving all of said cells into the ON light-emitting state for directing light to said image bearing document such that portions of said light are blocked by portions of said image bearing document;

interrogatively scanning said plasma panel by sequentially changing each ON cell to the OFF state;

while simultaneously sequentially determining with said optical read-out apparatus for each of said cells whether light emitting therefrom was visible through said image bearing document or was substantially blocked immediately prior to the respective cell state change from ON to OFF during said interrogative scanning; and restoring to the ON state one of the two groups of cells respectively associated with said determined visible or substantially blocked conditions, whereby said image is transferred to a corresponding one of said two groups of cells on said panel.

8. The method of claim 7, wherein the group of cells whose associated light output was determined by said read-out apparatus as visible through said image bearing document are restored to the ON state after being interrogatively scanned, so that said image is represented on said plasma panel by the group of cells whose associated light output was substantially blocked.

9. A method for transferring an image from an image bearing document to a plasma panel of gaseous discharge cells via optical read-out apparatus comprising:

sequentially driving said cells from the OFF to the ON light emitting state such that portions of said light are blocked by portions of said image bearing document;

while simultaneously determining with said optical read-out apparatus for each of said cells whether light emitting therefrom was visible through said image bearing document or was substantially blocked when said sequential driving of said cells to the ON state; and restoring to the OFF state one of the two groups of cells respectively associated with said determined visible or substantially blocked conditions, whereby said image is transferred to a corresponding one of said two groups of cells on said panel.

10. The method of claim 9, wherein the group of cells whose associated light output was determined by said read-out apparatus as substantially blocked by a portion of said image bearing document are restored to the OFF state, so that said image is represented by the group of cells whose associated light output was substantially blocked.

11. Apparatus for transferring an image from an image bearing document to a plasma panel of gaseous discharge cells comprising:

optical read-out means positioned to view light emitted from said gaseous discharge cells which passes through said image bearing document;

means for sequentially driving said cells to the ON light emitting state so that a first group of said cells are visible by said optical read-out means whereas a second group of cells are substantially blocked by a portion of said image bearing document and are therefore not visible by said optical read-out apparatus; and means for selectively restoring to the OFF state the group of cells which are substantially blocked by a portion of said image bearing document, whereby said image is transferred to the panel.

12. Apparatus as claimed in claim 11, including means for initially driving all of said cells to the ON state and for sustaining said cells in the ON state by a repetitive sustaining sequence; and timing means for sequentially driving said cells to the ON state intermediate respective sustaining sequences.

13. Apparatus as claimed in claim 12, wherein said timing means includes means for activating said read-out apparatus in synchronism with the sequential driving of said cells to the ON state.

* * * * *